United States Patent
Mulukutla et al.

(10) Patent No.: US 6,898,593 B1
(45) Date of Patent: May 24, 2005

(54) SORTED-PAGED RETRIEVAL OF HIERARCHICAL DATA FROM RELATIONAL DATABASES

(75) Inventors: Ramkartik Mulukutla, Irving, TX (US); Haiying Wang, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 465 days.

(21) Appl. No.: 10/072,399

(22) Filed: Feb. 5, 2002

Related U.S. Application Data
(60) Provisional application No. 60/304,534, filed on Jul. 10, 2001.

(51) Int. Cl.[7] .............................................. G06F 17/30
(52) U.S. Cl. ............................... 707/3; 707/10; 707/102
(58) Field of Search .................... 707/1–10, 100–104.1, 707/200–205

(56) References Cited

U.S. PATENT DOCUMENTS 5,412,804 A * 5/1995 Krishna ......................... 707/2
6,735,593 B1 * 5/2004 Williams ..................... 707/102

* cited by examiner

*Primary Examiner*—Mohammad Ali
(74) *Attorney, Agent, or Firm*—James E. Walton

(57) ABSTRACT

A method for sorted-paged retrieval of hierarchical data from a relational database is disclosed, which includes the use of one or more relational table equi-join terms in a query to increase the retrieval efficiency, suitable restrictions imposed on the join terms to further increase the retrieval efficiency, partial de-normalization or replication of information to improve the efficiency of the join operation(s) and thus further increase the retrieval efficiency, and proper cursor management to keep track of the current location of the cursor(s) involved. As a result, specific pages of objects can be efficiently retrieved from a database, while the specified sort orders and restrictions imposed by the original retrieval requests can be maintained.

33 Claims, 1 Drawing Sheet

US 6,898,593 B1

SORTED-PAGED RETRIEVAL OF HIERARCHICAL DATA FROM RELATIONAL DATABASES

RELATED APPLICATIONS

This application claims the benefit, under 35 U.S.C. § 119(e), of U.S. Provisional Application Ser. No. 60/304,534, filed Jul. 10, 2001.

TECHNICAL FIELD OF THE INVENTION

The present invention relates in general to electronic commerce and database management and, in particular, but not exclusively, to a high performance sorted-paging technique for retrieving hierarchical data such as, for example, business objects from relational databases.

BACKGROUND OF THE INVENTION

The use of object-oriented programming languages, such as C++, SMALLTALK™, JAVA™, and OBJECT PASCAL™, has allowed system designers and programmers to significantly increase the design flexibility and performance of business applications in electronic commerce environments. Object-oriented programming languages allow programmers to define the data type of a data structure, and the types of operations that can be applied to the data structure. As a result, the data structure becomes an "object", which is a self-contained entity including both data and procedures (e.g., code) to manipulate the data.

A business object is an object that is modeled from a business concept, such as, for example, a business person, place, event, or process. As such, business objects can be created to represent actual business entities, such as products, purchase orders, invoices, payments, customers, suppliers, employees, etc. Business objects are scalable and can be used in various configurations and at multiple levels. By taking advantage of object-oriented technologies, business objects can be used to develop and customize business applications.

A relational database is a database organized as a collection of tables. Each table includes a set of columns and rows. The tables in a relational database can be related to each other by using the same value in a link field (e.g., referred to as a key field or foreign key field). Business objects (e.g., Purchase Orders, Advance Shipping Notices, Invoices, etc.) are hierarchical in nature. For example, a typical Purchase Order contains multiple line items, and each of the line items contains multiple schedules. Furthermore, each of the schedules contains a request, which in turn, can contain multiple promises. Consequently, when a hierarchical object (e.g., Purchase Order) is retrieved from a relational database, all of this information stored in the related tables has to be retrieved.

For example, using a typical Business-to-Business (B2B) collaborative software application, a user may login to the application and enter a search request for all Purchase Orders that were created within a certain date range. The results of such a search may not be scalable (e.g., deployable in various configurations from one-tier to n-tiers) if all of the Purchase Orders identified by the search are retrieved and displayed to the user, because the number of Purchase Orders retrieved can be very large (e.g., hundreds), and the Purchase Orders themselves can include a large amount of information. Consequently, in typical multi-user environments operating under heavy load conditions, the existing techniques used to retrieve hierarchical business objects can excessively stress the database servers, systems and networks involved. Accordingly, a pressing need exists for a retrieval technique that can retrieve hierarchical data from a relational database and is significantly more efficient than previous retrieval techniques.

SUMMARY OF THE INVENTION

According to the present invention, disadvantages and problems associated with previous retrieval techniques may be reduced or eliminated.

According to one example embodiment of the present invention, a method for sorted-paged retrieval of hierarchical data from a relational database includes the use of one or more relational table equi-join terms in a query to increase the retrieval efficiency, suitable restrictions imposed on the join terms to further increase the retrieval efficiency, partial de-normalization or partial replication of information to improve the efficiency of the join operation(s) and thus further increase the retrieval efficiency, and proper cursor management to keep track of the current location of the cursor(s) involved. As a result, the present invention can efficiently retrieve specific pages of objects from a database, while maintaining the specified sort orders and restrictions imposed by the original retrieval requests.

Certain embodiments of the present invention may provide one or more technical advantages over previous techniques. For example, the present invention may be used to efficiently retrieve specific pages of objects from a relational database and also maintain a specified sort order and the restrictions imposed, without needing to use dynamic cursors and incurring their associated overhead. As such, the present invention may be used for search screens or displays, whereby a user can determine the number of objects to be retrieved at a time (e.g., objects per page), the search criteria to use, and the sort order for displaying the search results. As such, the present invention may allow users to move forward or backward readily to specific pages of data. The present invention may thereby provide high performance screens to users for viewing business objects and relatively short development times for implementing such screens, which can significantly increase the feasibility of rap-d development of scalable applications, and reduce the time to market for the products involved. As such, systems and methods incorporating one or more of these or other advantages may be well suited for commercial environments, such as those associated with Internet-accessible websites or electronic marketplaces. Other technical advantages of the present invention will be readily apparent to one skilled in the art from the figures, description and claims included herein.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
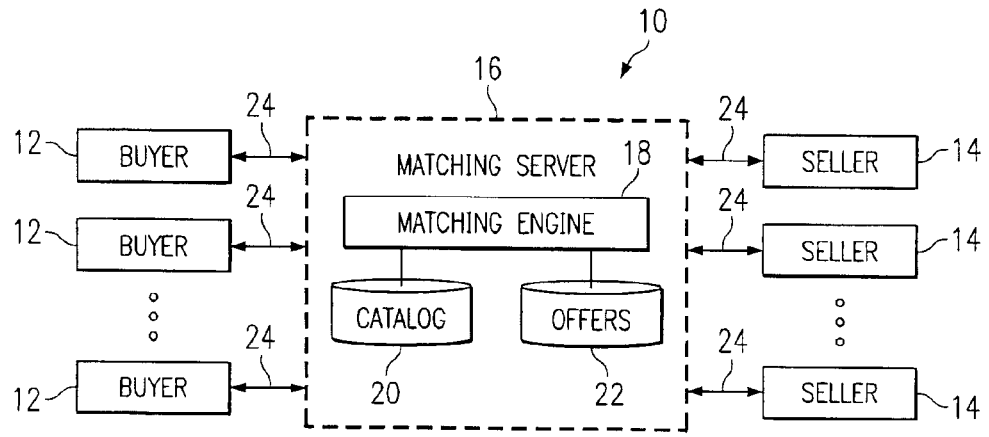
FIG. 1 illustrates an example system for retrieving hierarchical data from a relational database, which can be used to implement one example embodiment of the present invention.
Figure 2:
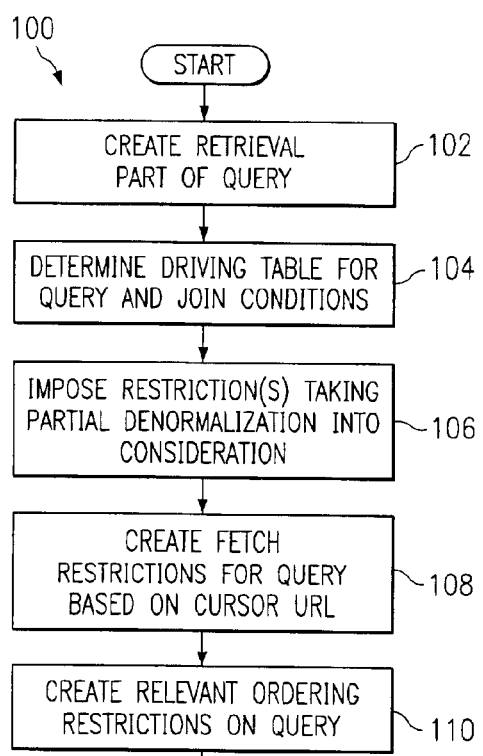
FIG. 2 illustrates an example method for retrieving hierarchical data from a relational database, which can be used to implement one example embodiment of the present invention.

The preferred embodiment of the present invention and its advantages are best understood by referring to FIGS. 1–2 of the drawings, like numerals being used for like and corresponding parts of the various drawings.

FIG. 1 illustrates an example system 10 for retrieving hierarchical data from a relational database, which can be used to implement one example embodiment of the present invention. System 10 can include one or more buyers or customers 12, one or more sellers or suppliers 14, and at least one matching server 16 associated with a website, electronic marketplace, or other environment accessible to buyers 12 and sellers 14. In general, matching server 16 can receive a search request from a buyer 12 that expresses the needs of buyer 12, such as for example, needs for one or more target products, services, properties, documents, or other items that can be obtained from sellers 14 through a marketplace associated with matching server 16. In response to the search request, matching server 16 can use associated matching engine 18 to apply the matching criteria against a catalog database 20. Catalog database 20 can contain information concerning items currently or potentially available from sellers or suppliers 14. Also, matching engine 18 can apply the matching criteria against an offers database 22 that can contain pending offers from one or more sellers 14. Matching engine 18 can retrieve information concerning available items from the appropriate database 20 or 22, according to the matched criteria, and return the results to buyer 12 or seller 14. The results can be sorted based on the parameters input for the target item that reflect their relevance to buyer 12 or seller 14, preferences of buyer 12 or seller 14, or other considerations, in order to allow buyer 12 or seller 14 to make purchasing or other appropriate decisions. In one example embodiment, databases 20 and 22 can be relational database systems (e.g., IBM DB2 6.x® or Oracle 8.1.x® database systems) for storing business data or objects.

Buyers 12 can be any suitable entities that access matching server 16, either autonomously or relying on input from associated persons, to discover information concerning one or more available items in connection with a purchase or other activity. Sellers 14 can be any suitable entities that provide information to matching server 16 concerning the available items. As such, buyers 12, sellers 14, and matching server 16 can be coupled to one another using links 24. For example, links 24 can include one or more local area networks (LANs), metropolitan area networks (MANs), wide area networks (WANs), at least a portion of a global network such as the Internet, or any other suitable wireline, optical, wireless, or other type of link. In one aspect of this embodiment, matching server 16 can be associated with an electronic B2B marketplace that facilitates B2B transactions between buyers 12 and sellers 14 over the Internet using one or more links 24. Although matching server 16 is described herein primarily for illustrative purposes, as separate from buyers 12 and sellers 14, matching server 16 can share one or more computer resources or other appropriate resources with one or more buyers 12 and/or sellers 14 according to particularized needs.

A search request can be generated for any suitable purpose. In the database management systems (DBMS) field, a query is one such type of search request. A query is a database language expression that describes the data to be retrieved from a database, such as catalog database 20 or offers database 22. For example, a query can be expressed in Structured Query Language (SQL) form, or in any other suitable form. For one example embodiment, queries expressed in SQL form are primarily described herein, but the present invention also contemplates any appropriate query, search request, or other representation that can be used to quickly express the needs of buyer 12 or seller 14 in terms of matching criteria.

For example, a buyer 12 may be a consumer who constructs and submits a query to a shopping "bot" associated with the matching server 16 to determine availability, pricing, or other information concerning a retail product that the consumer is interested in purchasing. Alternatively, a buyer 12 may be a procurement manager or autonomous procurement process within an organization that constructs and submits queries concerning parts needed to manufacture products or concerning any other tangible or intangible items. As still another alternative, a buyer 12 may generate and submit queries during negotiations with one or more sellers 14, which are mediated by matching server 16. In response, the matching engine 18 of matching server 16 returns data matching the input values.

In accordance with one example embodiment of the present invention, objects having hierarchical structures (e.g., Purchase Orders, Advance Shipping Notices, Invoices, etc.) may be mapped to multiple tables in a relational database (e.g., database 20 or 22). Preferably, these objects can have a one-to-one relationship with the database tables. Consequently, the database tables can have a parent-child relationship which is similar to that of the hierarchical objects involved.

In accordance with one example embodiment of the present invention, a method for sorted-paged retrieval of hierarchical data from a relational database includes the use of one or more relational table equi-join terms in a query to increase the retrieval efficiency, suitable restrictions imposed on the join terms to further increase retrieval efficiency, partial de-normalization or partial replication of information to improve the efficiency of the join operation(s) and thus further increase the retrieval efficiency, and proper cursor management to keep track of the current location of the cursor(s) involved. As a result, the present invention can efficiently retrieve specific pages of objects from a database, while maintaining the specified sort orders and restrictions imposed by the original retrieval requests.

For example, when a hierarchical object (e.g., Purchase Order, Advance Shipping Notice, Invoice, etc.) is to be retrieved from a relational database, a "join" query (e.g., an operation that matches rows from one table to another using one or more column values) may be executed for all tables to which the hierarchical object is mapped (and from which the object of interest is to be constructed). Notably, using such a join query facilitates the introduction of a Surrogate Cursor Id on the driving table (e.g., lowest level, inner join table in the hierarchy involved). Additionally, in order to improve the efficiency of the join operation to be performed, the join operation may be combined with suitable restrictions.

For example, during the performance of a join operation for retrieval, the columns most frequently restricted may be partially de-normalized (e.g., column information replicated) into the driving table. As such, the Surrogate Cursor Id created on the driving table can be unique within the scope of the driving table, and can include a sequence of increasing values as the new objects are inserted into the driving table. A User Interface (UI) or other suitable client resource can maintain the current value of the Surrogate Cursor Id (which is the value of the Surrogate Id on the last object received), along with the sort order column, and the minimum or maximum value of the sorted column (e.g., for a descending or ascending sort, respectively).

For each request entered from a client for a page of objects to be retrieved, the UI (or other client resource) can include the Surrogate Cursor Id information, sort order column information, and the minimum or maximum value information for the sorted column, in addition to the page size information required by the UI (or other client resource). A retrieval Application Programming Interface (API) can be used to view the Surrogate Cursor's properties, and retrieve from the relational database (e.g., 20 or 22) the exact page size of objects (e.g., 50 objects per page) using the Cursor Id and the current minimum or maximum values for the sorted column as a reference. The API can then return the retrieved page of objects to the client (e.g., for display with a suitable screen).

In accordance with the present invention, the terms "page" or "paging" can mean an ability to retrieve enough composite top-most level objects in a hierarchy, so that these objects together can include a fixed number of the lowest level objects (e.g., thus defining the page size). Typically, most UI and client systems can display and process data based on the number of lowest level objects in the hierarchy being received. Since a composite object can be very large, many high performance screens typically perform paging based on the lowest level object involved. For example, a typical Purchase Order can include 100 line items, and each line item can include 100 schedules. Consequently, in retrieving Purchase Orders or similar information from a relational database, it is useful for a UI to display the retrieved information in a tree structure or de-normalized structure to a user, but preferably with only 50 schedules at a time (e.g., 50 objects per page).

As such, in accordance with the present invention, a user may be shown a fixed number of retrieved objects (e.g., a page including 50 lines of Purchase Order objects) on a screen at a time. The user may then be allowed to navigate to the next 50 objects (e.g., a second page) or return to any other page of objects as desired. Also, the user may elect to view retrieved business objects sorted in accordance with specific criteria selected by the user. For example, a user may desire to display Purchase Order objects sorted by their creation dates, etc.

For one example embodiment of the present invention, in order to improve the efficiency and scalability of the information retrieval process, join operations can be performed to fetch hierarchical objects stored in the relational database. The join operations can return a de-normalized or replicated view of a new object that is constructed from the original object that was stored. As such, the join operations can reduce network overhead substantially, by reducing the number of database roundtrips required to retrieve all of the objects involved, and also providing single points that can be useful for fine-tuning the queries and retrievals.

Partial de-normalization of the retrieved objects can provide substantially higher performance than previous techniques for the join operations performed, because by using de-normalization, the most frequently searched entities in a hierarchical business object can be copied down to the lowest level in the relational table hierarchy. Also, most of the restrictions imposed on the join operations are for the lowest level table of the hierarchy. As a result, the lowest level table in the hierarchy can become the driving table in such a join operation. Also, as mentioned above, the lowest level table of the hierarchy can be heavily restricted and thus overloaded. Consequently, there are relatively few tuples (e.g., records in a relational database) formed in the Cartesian product of the tables that are rejected during the join operation. Therefore, the advantages of de-normalization or replication of information down to the lowest level table in the hierarchy more than outweigh any overhead or simple housekeeping tasks associated with replicating the most frequently searched entities.

For example, as mentioned earlier, a typical Purchase Order can include a plurality of line items, each line item can include a plurality of schedules, and each schedule can include a request and, possibly, a plurality of promises. An object representing such a Purchase Order can be mapped to four tables, such as, for example, a HEADER table, LINE_ITEM table, REQUEST_SCHEDULE table, and PROMISE_SCHEDULE table. As such, a typical Purchase Order may or may not include a promise schedule. However, a typical Purchase Order should include at least one line item, and each line item should include at least one request schedule (e.g., in order to consider that Purchase Order for retrieval) Accordingly, for the above-described example, a REQUEST_SCHEDULE can be the Purchase Order element most suitable for partial de-normalization. Note that although a PROMISE_SCHEDULE is below a REQUEST_SCHEDULE in the hierarchy of a typical Purchase Order, a PROMISE_SCHEDULE is not a mandatory element of a typical Purchase Order and, consequently, should not be used for a driving table during a join operation.

In order to implement de-normalization (e.g., replication of the stored objects) for the above-described example, the most preferable search restrictions to be imposed on a typical Purchase Order object are the PO_NUMBER, CUSTOMER_NAME, SUPPLIER_NAME (residing in the HEADER table), ITEM_NAME, ITEM_CATALOG_DOMAIN (residing in the LINE_ITEM table), REQUEST_QUANTITY, REQUEST_DATE, and REQUEST_LOCATION (residing in the REQUEST_SCHEDULE table). Prior to performing de-normalization (e.g. if a DB2® database system is being used), an example of a structure for a join query that can be used for retrieving Purchase Order information (e.g., to fetch a page subsequent to the page being viewed) from a relational database is as follows:

```
SELECT
HEADER.PO_NUMBER, HEADER.CUSTOMER_NAME, . . . (other
HEADER columns)
LINE_ITEM.ITEM_NAME, LINE_ITEM.CATALOG_DOMAIN,
. . . (other LINE_ITEM columns)
REQUEST_SCHEDULE.REQUEST_QUANTITY, . . . (other
REQUEST_SCHEDULE columns)
FROM
HEADER, LINE_ITEM, REQUEST_SCHEDULE,
PROMISE_SCHEDULE
WHERE
HEADER.PO_ID = LINE_ITEM.PO_ID
. . . (Other join conditions)
AND
HEADER.CUSTOMER_NAME='Customer1'
AND
LINE_ITEM.ITEM_NAME='Golf Caps'
AND(
HEADER.PO_NUMBER > 'PO_50' OR /* Current Sort column
value at cursor location*/
(REQUEST_SCHEDULE.CURSOR_ID > 12345 /* Cursor Id*/
AND
HEADER.PO_NUMBER == 'PO50')
)
FETCH FIRST 50 ROWS ONLY /* Fetch the next 50 */
    (For Oracle database, "ROWNUM < 51")
ORDER BY
PO_NUMBER, CURSOR_ID
```

In the above-described query (prior to de-normalization), the restrictions imposed on that example search can be spread across three tables, namely a HEADER table, LINE_

ITEM table, and REQUEST_SCHEDULE table. As a result, the processing of the search query can be much more intensive for the database used, because there can be many other tuples that are rejected. Also, note that it is technically possible to perform a sort merge operation during such a join operation. However, for the above-described example, performance of a sort merge operation with the join operation is not considered the best approach to follow. As such, there may be 0 or more rows fetched from a PROMISE_SCHEDULE table, because such a join operation is an outer join.

In order to optimize the above-described Purchase Order search query (e.g., made prior to partial de-normalization), another query can be made subsequent to partial de-normalization. For example, a second query can be created (for optimization purposes) by changing the original query (described above) to read as follows:

```
SELECT
HEADER.PO_NUMBER, HEADER.CUSTOMER_NAME, . . . (other
HEADER COLUMNS)
LINE_ITEM,ITEM_NAME, LINE_ITEM.CATALOG_DOMAIN,
. . . (other LINE_ITEM columns)
REQUEST_SCHEDULE.REQUEST_QUANTITY, . . . (other
REQUEST_SCHEDULE columns)
FROM
REQUEST_SCHEDULE, HEADER, LINE_ITEM,
PROMISE_SCHEDULE /* Request Schedule is the driving
table */
WHERE
HEADER.PO_ID = LINE_ITEM.PO_ID
. . . (Other join conditions)
AND
REQUEST_SCHEDULE.CUSTOMER_NAME='Customer1' /*
Instead of applying to HEADER */
AND
REQUEST_SCHEDULE.ITEM_NAME='Golf Caps' /* Instead of
applying to LINE_ITEM */
AND(
REQUEST_SCHEDULE.PO_NUMBER > 'PO50' OR /* Current
Sort column value at cursor location */
(REQUEST_SCHEDULE.CURSOR_ID > 12345 /* Cursar Id*/
AND
REQUEST_SCHEDULE.PO_NUMBER == 'PO50')
)
AND
FETCH FIRST 50 ROWS ONLY /* Fetch the next 50 */
    (For Oracle database, "ROWNUM < 51")
ORDER BY
PO_NUMBER, CURSOR_ID
```

Note that, for brevity purposes, the above-described original and optimization queries do rot include NULL conditions and other boundary conditions that may be included if so desired.

As illustrated by the above-described example Purchase Order retrieval query (e.g., after partial de-normalization), all of the restrictions (e.g., including a cursor restriction) are preferably imposed on the REQUEST_SCHEDULE table (e.g., lowest level table in hierarchy). Also, the database system involved can be instructed to fetch 50 rows of Purchase Order objects or information (e.g., 50 objects a page). In this example, the REQUEST_SCHEDULE table is preferably the driving table in the join operation. As such, the database server can fetch 50 rows from the driving table (e.g., REQUEST_SCHEDULE table) and then fetch 50 rows from each of the LINE_ITEM and HEADER tables using, for example, a conventional primary key lookup operation. As a result, the join operation thus performed has formed a nested loop join, which can be scalable as long as the number of rows of information being fetched is known in advance.

Essentially, as described above, using partial de-normalization for a retrieval query, the present invention advantageously provides additional scope for a database server to optimize the fetch operation. Note, for the above-described example, that there can be 0 or more rows fetched from a PROMISE_SCHEDULE table, because it evolves from an outer join. Actual performance evaluations using partial de-normalization for Purchase Order retrieval queries have demonstrated that this retrieval technique performs significantly better than previous retrieval techniques. By performing partial de-normalization with a retrieval query, the present invention advantageously can add substantially more equi-join conditions than are typically created by previous retrieval techniques. As such, this advantage can be exploited further by the use of additional restrictions imposed on the query formed, which can reduce the possibility of an index range scan occurring for the nested loop join operation on the non-driving table(s), and thereby further improve the performance of the retrieval process. An example of additional equi-join conditions that may be imposed for a Purchase Order retrieval query due to the use of partial de-normalization is as follows:

```
. . .
HEADER.PO_ID = REQUEST_SCHEDULE.PO_ID AND
HEADER.PO_NUMBER = REQUEST_SCHEDULE.PO_NUMBER
AND
```

In accordance with the present invention, a third technique that can be used to improve the efficiency of information retrieval from a relational database is proper cursor management with an efficient paging algorithm. For example, a UI or client system resource that requests the retrieval of hierarchical objects from a database server can send a Uniform Resource Locator (URL) or Web address for a Cursor to the database server in an API call. Such a Cursor URL can include a string of, for example, three components including a Surrogate Cursor Id, a maximum value of a sort order by column included in the Cursor URL (e.g., sort in ascending order), and a name of a column upon which the ordering of the results are to be based. Along with such a Cursor URL, a UI or other client resource can also send to the server a value representing the number of lowest level objects to be retrieved. The following is example code illustrating a UI's or client's interaction with such a database server:

```
First Page:
//The client is asking for POs that satisfy the
//given search Criteria and is asking for the first
//50
//a -1 indicates the first page
//the Cursor URL is a simple string with "| " as the
//delimiter
    PurchaseOrder pos[] = poAccessor.getPOs
    ( searchCriteria, 50, "-1 | null | PO_NUMBER") ;
//Second Page:
//The client received 50 objects and the max value
//of PO_NUMBER it received so far is "PO_50" and the
//value of the last cursor id it received is 10050
    pos = poAccessor.getPOs( searchCriteria, 50,
        "10050 | PO_50 | PO_NUMBER") ;
//Third Page:
    pos = poAccessor.getPOs( searchCriteria, 50,
        "10100 | PO_100 | PO_NUMBER")
//Now if the client desires to return to first page,
```

-continued

```
//all client has to remember is the Cursor URL.
//A UI system can store this cursor URL as part of a
//hyper-link
    pos[] = poAccessor.getPOs( searchCriteria, 50,
        "-1 | null | PO_NUMBER") ;
```

Also, for a more efficient paging algorithm than previous paging algorithms, a fetch algorithm can be used to take the current maximum value for the sort order column and impose a restriction stating that the next page should have column values that are greater than the current value of the column. Alternatively, for example, a restriction can be imposed stating that the next page retrieved should have column values that are the same as the current value of the column, but also for that next page, the Cursor Id value should be greater than the current Cursor Id value. The results of such a fetch operation are thus ordered by the sort column name and Cursor Id (in that order). Because of de-normalization, most of the queries thus created can have both the sort column and Cursor Id present in the driving table. The fetch algorithm can use a "FETCH FIRST N ROWS" construct for a DB2® database query, or a "ROWNUM" construct for an Oracle® database query, in order to tell the database how many rows can be returned to satisfy the restrictions imposed.

For an initial call from a client to a database server, the client can send arguments to the server including a Cursor Id value of −1, and a NULL value for the sort column. For subsequent calls from that client, the client can send the maximum value of the sort column which will be in the last object that it receives from the previous call (this example illustrates an ascending sort, and for a descending sort, the minimum value will be included). The client can view the last object received in the sorted order and form a suitable Cursor URL. The next page can be fetched based on this Cursor URL, and so on and so forth, for the subsequent pages to be retrieved. An example query that can be formed by such a fetch or paging algorithm is illustrated above as the query subsequent to partial de-normalization.

Note, for this example, that the term "page size" can refer to the number of lowest level objects in the hierarchy to be retrieved (e.g., number of distinct REQUEST_SCHEDULE objects to retrieve). If a one-to-one correspondence exists between the various tables involved in the hierarchy, the number of Purchase Order objects returned can be equal to the page size. As such, a typical Graphical UI (GUI) can display hierarchies to a client in a de-normalized manner on a per line basis, and be used to specify the number of lines needed from the database server (e.g., which can equal the number of lowest level objects to be retrieved).

The following illustrates an example fetch operation that can be performed using the above-described fetch or paging algorithm. For this example, the outer join table can be excluded for simplicity. The values in parentheses can represent the referential integrity constrains. For example, the characters L1(H1) can mean that a line item L1 belongs to a Purchase Order with a header H1 and whose PO_NUMBER is PO_1. Under the REQUEST_SCHEDULE heading, the middle and right-most values shown can represent the Cursor Id and de-normalized PO_NUMBER, respectively.

| HEADER | LINE ITEM | REQUEST SCHEDULE |
|--------|-----------|------------------|
| H1 PO_1 | L1 (H1) | R1 (H1, L1) 1001 PO_1 |
| H2 PO_3 | L2 (H1) | R2 (H1, L1) 1023 PO_1 |
| H3 PO_2 | L3 (H2) | R3 (H1, L1) 1035 PO_1 |
| H4 PO_5 | L4 (H3) | R4 (H1, L2) 1500 PO_1 |
| H5 PO_4 | L5 (H4) | R5 (H2, L3)  999 PO_2 |
|         | L6 (H5) | R6 (H3, L4)  875 PO_3 |
|         |         | R7 (H4, L5) 2000 PO_4 |
|         |         | R8 (H5, L6) 4555 PO_5 |

Assume, for this example, that the Page size=2, and the fetch operation is intended to fetch all POs in order according to their PO_NUMBER:
First Page: Cursor URL="−1|null|PO_NUMBER", Page size=2. The resulting query appears similar to that of the above-described query subsequent to partial de-normalization, except for the cursor restrictions as illustrated below (excluding NULL cases for brevity).

```
AND(
REQUEST_SCHEDULE.PO_NUMBER > ' '/* Blank string for the
first page*/
)
```

Results for the First Page:

| H1 | L1 | R1 (H1, L1) 1001 PO_1 |
| H1 | L1 | R2 (H1, L1) 1023 PO_1 |

Second Page: Cursor URL="1023|PO_1|PO_NUMBER", Page size=2
Again, the resulting query appears similar to that of the above-described query subsequent to partial de-normalization.
Results for the Second Page:

| H1 | L1 | R3 (H1, L1) 1035 PO_1 |
| H1 | L2 | R4 (H1, L2) 1500 PO_1 |

Third Page: Cursor URL="1500|PO_|PO_NUMBER", Page size=4 (e.g., page size can be different with each call)
Once again, the resulting query appears similar to that of the above-described query subsequent to partial de-normalization.
Results for the Third Page:

| H2 | L2 | R5 (H2, L3)  999 PO_2 |
| H3 | L3 | R6 (H3, L4)  875 PO_3 |
| H4 | L4 | R7 (H4, L5) 2000 PO_4 |
| H5 | L5 | R8 (H5, L6) 4555 PO_5 |

Final Call: Cursor URL="4555|PO_5|PO_NUMBER"
Results for the Final Call: None.

The above-described retrieval techniques can be modified to retrieve objects without any particular column sort. In this case, for example, the Surrogate Cursor Id can provide the order for the resulting set. This retrieval technique can perform better than the above-described techniques, because this technique can result in less sorting operations for the database system involved. Also, the performance of this retrieval technique can be further increased by creating an index on the Surrogate Cursor Id used. For example, the following query can be used for retrieving objects from a relational database without a specific sort order:

```
SELECT
HEADER.PO_NUMBER, HEADER.CUSTOMER_NAME, . . . (other
HEADER columns)
LINE_ITEM.ITEM_NAME, LINE_ITEM.CATALOG_DOMAIN, . . .
(other LINE_ITEM columns)
REQUEST_SCHEDULE.REQUEST_QUANTITY, . . . (other
REQUEST_SCHEDULE columns)
FROM
REQUEST_SCHEDULE, HEADER, LINE_ITEM,
PROMISE_SCHEDULE/*
Request Schedule is the driving table*/
WHERE
HEADER.PO_ID = LINE_ITEM.PO_ID
. . . (Other join conditions)
AND
REQUEST_SCHEDULE.CUSTOMER_NAME='Customer1'/* Instead
of applying to HEADER */
AND
REQUEST_SCHEDULE.ITEM_NAME='Golf Caps'/* Instead of
applying to LINE_ITEM */
AND(
/* The only cursor restriction here is based on the
cursor id*/
REQUEST_SCHEDULE.CURSOR_ID > 12345 /* Cursor Id*/
)
AND
FETCH FIRST 50 ROWS ONLY /* Fetch the next 50*/
    (For Oracle database, "ROWNUM < 51")
ORDER BY
CURSOR_ID
```

An optimum approach for using the above-described query for retrieval without a specific sort order is to direct a user to a page without prescribing a particular sort order, and then let the user select the sort criteria to use. This approach can give a user more time to think about the approach to use, and also a better perception of the query's potential performance.

As mentioned earlier, the above-described example retrieval queries can be used with a DB2 database system (e.g., DB2 6.x®). These queries can also be used with other types of database systems. For example, in accordance with a second example embodiment of the present invention, a high performance sorted-paged method for retrieving objects from a relational database can be implemented for an ORACLE database (e.g., Oracle DB 8.1.x®). Notably, however, some ORACLE database system versions may be restricted somewhat if "ORDER BY" and "ROWNUM" instructions are used in conjunction with each other. For example, certain ORACLE database systems first number the rows and create a pseudo-column called ROWNUM and then ORDER BY. The ordering of this procedure can cause unpredictable results for a retrieval query, because the retrieval query can include a paging clause such as "ROWNUM<51". On the other hand, a DB2 database system is not so restricted if a "FETCH FIRST N ROWS ONLY" instruction is used in conjunction with an "ORDER BY" instruction.

One technique that can be used to avoid the above-described problem for certain ORACLE database versions is to introduce an index hint referring to the index on the column(s) to which the "ORDER BY" instruction is being applied. The ORACLE database system can respond by forcing the fetch in the order dictated by the index, which is the desired sort order. However, a problem with this index hint type of approach is that it does not guarantee success.

Also, index hint approaches can be affected significantly by the mode of operation of the optimizer used.

In accordance with the present invention, a more reliable solution to the above-described problem with certain ORACLE database systems is to create a sub-query for the ORDER BY instruction including all restrictions imposed. Then, the associated super-query can be used to perform the ROWNUM operation. Consequently, the ORDER BY operation can be forced to take place before the ROWNUM operation is performed. An example of coding that can be used for such a retrieval approach is as follows:

```
SELECT . . . FROM(
SELECT
HEADER.PO_NUMBER AS H_PO_NUMBER, . . . (other HEADER
columns)
LINE_ITEM.ITEM_NAME AS L_ITEM_NAME . . . (other
LINE_ITEM columns)
REQUEST_SCHEDULE.REQUEST_QUANTITY AS . . . (other
REQUEST_SCHEDULE columns)
FROM
REQUEST_SCHEDULE, HEADER, LINE_ITEM,
PROMISE_SCHEDULE/*
Request Schedule is the driving table */
WHERE
HEADER.PO_ID = LINE_ITEM.PO_ID
. . . (Other join conditions)
AND
REQUEST_SCHEDULE.CUSTOMER_NAME='Customer1' /*
Instead of applying to HEADER */
AND
REQUEST_SCHEDULE.ITEM_NAME='Golf Caps' /* Instead of
applying to LINE_ITEM */
AND(
REQUEST_SCHEDULE.PO_NUMBER > 'PO_50' OR /* Current Sort
column value at cursor location*/
(REQUEST_SCHEDULE.CURSOR_ID > 12345 /* Cursor Id*/
AND
REQUEST_SCHEDULE.PO_NUMBER == 'PO50')
)
ORDER BY
PO_NUMBER, CURSOR_ID
)
WHERE
ROWNUM < 50 /* outer query places the ROWNUM restriction
*/
```

FIG. 2 illustrates an example method 100 for retrieving hierarchical data from a relational database, which can be used to implement one example embodiment of the present invention. At step 102, a user (e.g., buyer 12 or seller 14) can create a retrieval part of a query (e.g., including at least one join operation). A join operation can match records in those database tables (e.g., in database 20 or 22) that are joined by at least one common field. A join operation in a retrieval query can return to the user a de-normalized view of the object stored in the database For this example, a join operation can be made part of a SELECT query. At step 104, the user can determine what table is to be a driving table for the query and join conditions. For example, for retrieval of Purchase Order objects, a REQUEST_SCHEDULE table can be suitable for such a driving table. At step 106, the user can include in the retrieval query at least one restriction to be imposed for the driving table taking partial denormalization into consideration. For example, a preferred approach can be to impose all restrictions on the driving table (e.g., REQUEST_SCHEDULE table) for the join operation to be performed. At step 108, the user can include in the retrieval query an instruction for a database system to fetch restrictions for the query (e.g., data from a predetermined number of rows in the tables involved) For this Purchase Order example, a suitable instruction can be for the database system to fetch 50 rows of objects. In this case, the database server can fetch 50 rows from the driving table (e.g., REQUEST_SCHEDULE table) and 50 rows from each of the other tables involved (e.g., HEADER table and LINE_ITEM table). At step 110, the user can create relevant ordering restrictions on the query to be performed. For example, a UI or client resource that is used to call a database server for retrieval of hierarchical objects can send a Cursor URL to that server in an API call. For this Purchase Order example, the Cursor URL can include a Surrogate Cursor Id, a maximum value or minimum value for the ordering of the retrieval results by column (e.g., ascending or descending sort order, respectively), and the name of the column by which the retrieval results are to be ordered. Along with the Cursor URL, the UI or client resource can also convey to the database server the number of lowest level objects to be retrieved.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer-based method for retrieving hierarchical data from a relational database, comprising the steps of:
    creating a query for retrieving said hierarchical data, said query including at least one join term;
    selecting, for said query, a driving table from a plurality of database tables including said hierarchical data;
    imposing, for said query, at least one restriction on at least one table of said plurality of database tables including said hierarchical data; and
    performing partial denormalization by replicating frequently searched data of said hierarchical data into said driving table.

2. The method of claim 1, further comprising the step of:
    replicating frequently searched entities into said driving table.

3. The method of claim 1, further comprising the step of:
    sending said query to said relational database creating a surrogate id column on said driving table, said surrogate id column storing a sequence of increasing integer values as records inserted in said driving table.

4. The method of claim 1, further comprising the step of:
    creating a fetch instruction for said query, said fetch instruction including a number of rows of said hierarchical data to be retrieved.

5. The method of claim 1, further comprising the step of:
    creating a fetch instruction for said query, said fetch instruction causing an ordering to be performed before row numbers are assigned.

6. The method of claim 1, further comprising the steps of:
    creating a Cursor URL;
    sending said Cursor URL to a server, said server forming said query based on said Cursor URL; and
    sending said query to said relational database.

7. The method of claim 1, further comprising the steps of:
    sending said query to said relational database, said query including said at least one join term and said at least one restriction imposed on said at least one table of said plurality of database tables including said hierarchical data.

8. The method of claim 1, wherein said at least one table of said plurality of database tables including said hierarchical data comprises said driving table.

9. The method of claim 1, further comprising the steps of:
    creating an address field, said address field including a Surrogate Cursor Id, a maximum or minimum value for ordering said retrieving by column, and a name of a column associated with said ordering;
    sending said address field to a server, said server forming said query based on a Cursor URL; and
    sending said query to said relational database.

10. The method of claim 1, wherein said relational database comprises a DB2 database system.

11. The method of claim 1, wherein said relational database comprises an ORACLE database system.

12. The method of claim 1, wherein said query comprises a query formatted in SQL.

13. A computer-based system for retrieving hierarchical data from a relational database, comprising:
    a database; and
    a user interface, said user interface coupled to said database and operable to:
    create a query for retrieving said hierarchical data, said query including at least one join term;
    select, for said query, a driving table from a plurality of database tables including said hierarchical data creating a surrogate id column on said driving table, said surrogate id column storing a sequence of increasing integer values as records inserted in said driving table;
    impose, for said query, at least one restriction on at least one table of said plurality of database tables including said hierarchical data; and
    perform partial denormalization by replicating frequently searched data of said hierarchical data into said driving table.

14. The system of claim 13, wherein said user interface is further operable to:
    send said query to said database.

15. The system of claim 13, wherein said user interface is further operable to:
    create a fetch instruction for said query, said fetch instruction including a number of rows of said hierarchical data to be retrieved.

16. The system of claim 13, wherein said user interface is further operable to:
    create a Cursor URL;
    send said Cursor URL to said database; and
    send said query to said database.

17. The system of claim 13, wherein said user interface is further operable to:
    send said query to said relational database, said query including said at least one join term and said at least one restriction imposed on said at least one table of said plurality of database tables including said hierarchical data.

18. The system of claim 13, wherein said at least one table of said plurality of database tables including said hierarchical data comprises said driving table.

19. The system of claim 13, wherein said user interface is further operable to:
    create an address field, said address field including a Surrogate Cursor Id, a maximum or minimum value for ordering said retrieving by column, and a name of a column associated with said ordering;

send said address field to said database; and send said query to said database.

20. The system of claim 13, wherein said database comprises a relational database.

21. The system of claim 13, wherein said database comprises a DB2 database system.

22. The system of claim 13, wherein said database comprises an ORACLE database system.

23. The system of claim 13, wherein said query comprises a query formatted in SQL.

24. A computer-based system for retrieving hierarchical data from a relational database, comprising:

means for creating a query for retrieving said hierarchical data, said query including at least one join term;

means for selecting, for said query, a driving table from a plurality of database tables including said hierarchical data means for creating a surrogate id column on said driving table, said surrogate id column storing a sequence of increasing integer values as records inserted in said driving table;

means for imposing, for said query, at least one restriction on at least one table of said plurality of database tables including said hierarchical data; and means for performing partial denormalization by replicating frequently searched data of said hierarchical data into said driving table.

25. The system of claim 24, further comprising:

means for sending said query to said relational database.

26. The system of claim 24, further comprising:

means for creating a fetch instruction for said query, said fetch instruction including a number of rows of said hierarchical data to be retrieved.

27. The system of claim 24, further comprising:

means for creating a Cursor URL;

means for sending said Cursor URL to said relational database; and means for sending said query to said relational database.

28. The system of claim 24, further comprising:

means for sending said query to said relational database, said query including said at least one join term and said at least one restriction imposed on said at least one table of said plurality of database tables including said hierarchical data.

29. Software for retrieving hierarchical data from a relational database, the software being embodied in computer-readable media and when executed operable to:

create a query for retrieving said hierarchical data, said query including at least one join term;

select, for said query, a driving table from a plurality of database tables including said hierarchical data creating a surrogate id column on said driving table, said surrogate id column storing a sequence of increasing integer values as records inserted in said driving table impose, for said query, at least one restriction on at least one table of said plurality of database tables including said hierarchical data; and perform partial denormalization by replicating frequently searched data of said hierarchical data into said driving table.

30. The software of claim 29, when executed further operable to:

send said query to said relational database.

31. The software of claim 29, when executed further operable to:

create a fetch instruction for said query, said fetch instruction including a number of rows of said hierarchical data to be retrieved.

32. The software of claim 29, when executed further operable to:

create a Cursor URL;

send said Cursor URL to said relational database; and send said query to said relational database.

33. The software of claim 29, when executed further operable to:

send relational database, said query including said at least one join term and said at least one restriction imposed on said at least one table of said plurality of database tables including said hierarchical data.

* * * * *